June 14, 1927. 1,632,468
A. FONDEVILA
DRIVE GEARING
Filed Oct. 19, 1925 2 Sheets-Sheet 1
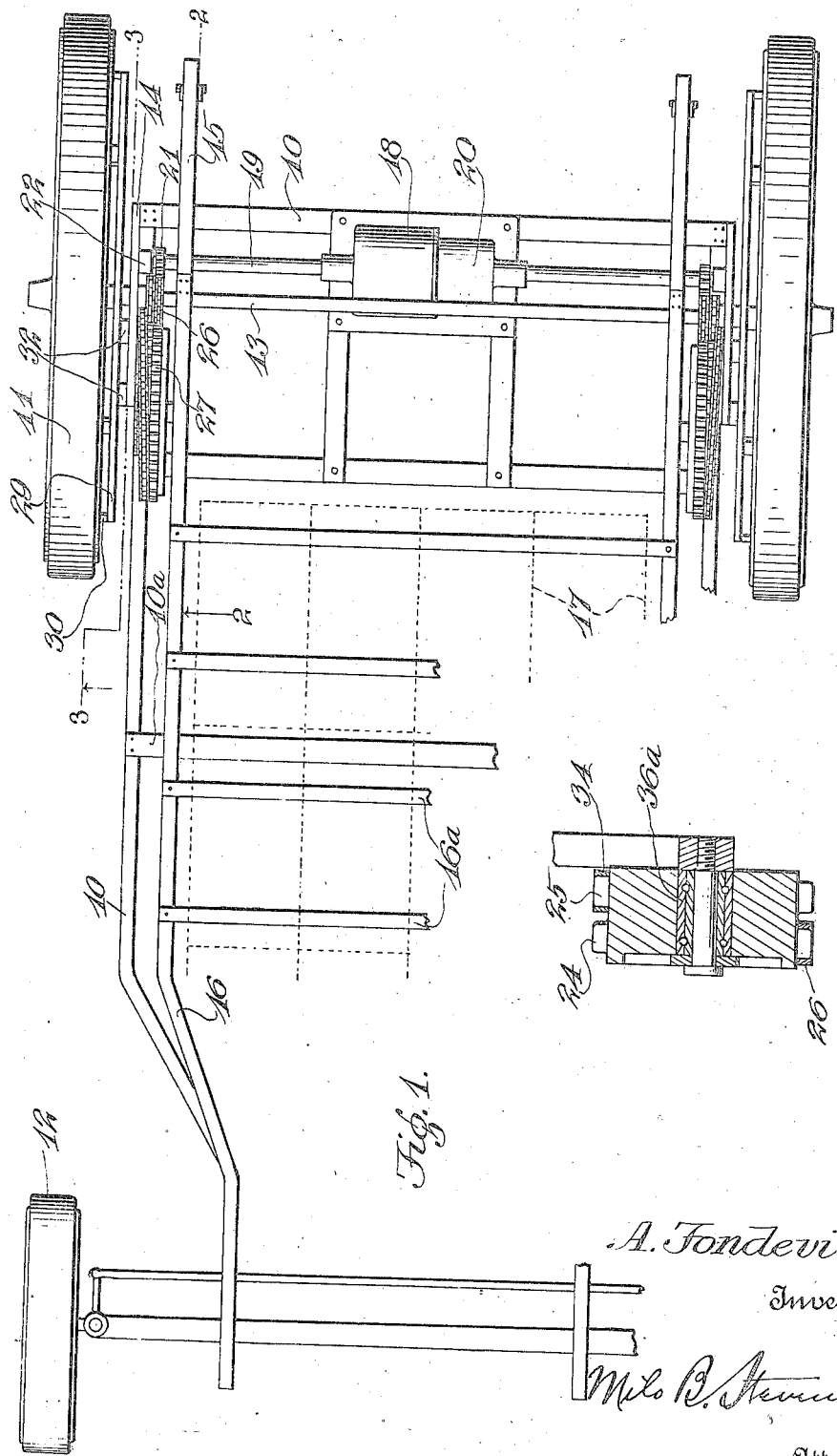

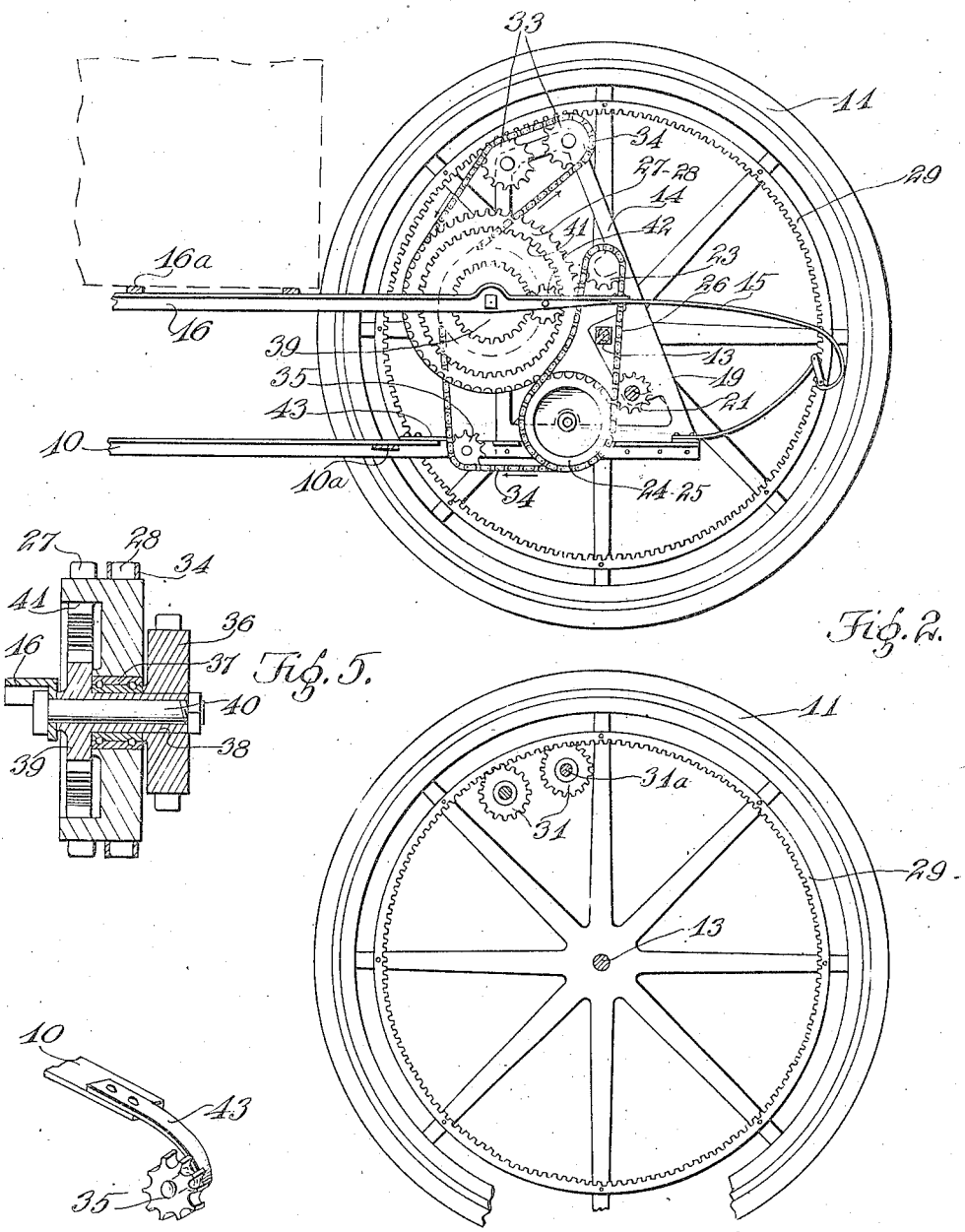

Patented June 14, 1927.

1,632,468

UNITED STATES PATENT OFFICE.

ANTONIO FONDEVILA, OF CHICAGO, ILLINOIS.

DRIVE GEARING.

Application filed October 19, 1925. Serial No. 63,381.

This invention relates to gearings for the transmission of power from a motive source, and more particularly to motor driven vehicles, its object being to lend the driven element steady and powerful motion.

A further object of the invention is to provide a gearing which is a unit with the traction wheels of the vehicle and readily adaptable to any power source.

A still further object of the invention is to make it a self-contained reduction unit to which the power source may be applied through high speed connections.

Another object of the invention is to provide a gearing of the type suggested which is shock absorbing, translating impulsive or uneven power delivery into continuous and smooth operation of the driven element.

With the above objects in view, and any others which may suggest themselves from the description and claims to follow, a better understanding of the invention may be had by reference to the accompanying drawings, in which:—

Figure 1 is a plan view of a vehicle incorporating the novel gearing, partly broken away;

Figs. 2 and 3 are sections on the lines 2—2 and 3—3, respectively of Fig. 1;

Fig. 4 is a cross-section of a double sprocket-wheel assembly;

Fig. 5 is a similar view of a combined gear and sprocket-wheel assembly; and

Fig. 6 is a perspective view of an idler support.

Referring specifically to the drawings, 10 denotes a typical base frame for a vehicle, 11 the rear wheels and 12 the front wheels. To provide support for the frame, an axle 13 is carried by truss plates 14 at the sides of the frame, the axle having trunnions passing loosely into the wheel hubs. By means of suitable springs, such as shown at 15, a body frame 16 is resiliently carried by the base frame 10. The latter has suitable reinforcing members 10ª, and the frame 16 also has a suitable arrangement of cross members 16ª for this purpose, as well as to form a support for a vehicle body. In the present showing the vehicle is designed to operate by electricity, and the position of the batteries for this purpose has been indicated by dotted lines at 17. The structure outlined above is used in the present connection merely for illustrative purposes, and has no novelty in a patentable sense. The structure is typical of power-driven vehicles in general, and its design and the character of its power plant may, with the use of the novel gearing, be varied in many ways without losing its applicability to the gearing.

In the showing outlined, the wheels 11 are carried loosely on the axle trunnions, and it is intended that they be driven by a motor 18 through the novel gearing. The motor is secured on the base frame 10 and provided with shaft extensions 19 leading to the wheels, one of these sections operating through the agency of a standard differential gearing, whose position is denoted at 20, to conform to the practice usually followed in this respect.

As the novel gearing is designed and applied alike in relation to each wheel 11, it will suffice if but one unit is described. Each motor shaft extension 19 receives a sprocket-wheel 21 before it lodges with its outer end in a bearing 22 carried by the corresponding truss plate 14. The latter also carries a sprocket-wheel 23 at a high point and a double sprocket-wheel 24—25 at a low point, these sprocket-wheels carrying a chain 26 in a plane adjacent to the sprocket-wheel 21, so that the latter meshes with the chain from the outside and therefore drives the same, the sprocket-wheels 23 and 24—25 merely acting as guides or idlers therefor.

That run of the chain 26 which is remote from the sprocket-wheel 21 is intended to transmit the motion of the chain to a large double sprocket-wheel 27—28 by peripheral meshing therewith, as in the instance of the sprocket-wheel 21 as shown in Figure 2. By "double sprocket-wheels" it is meant that the sprocket-wheels 24—25 and 27—28 each have two rows of teeth abreast; and for the present purpose the inner teeth, namely 24 and 27 are operatively connected by the chain 26.

The wheel 11 receives its motion through an internally-toothed ring 29 carried from the wheel by brackets 30 or other suitable means. As shown in Figure 3, two pinions 31 in tandem order are provided to mesh with the ring 29, the spindles 31ª of the pinions being journaled in bearings 32 outwardly formed from the truss plate 14. These bearings are continued on the inner side of the truss plate, and the spindles 31ª merge therefrom to receive tandem sprocket-wheels 33. A chain 34 passes over these in forward direction and down around the teeth 27 of the double sprocket-wheel 27—28, continuing over onto the teeth 24 of the double sprocket-wheel 24—25 and down along the rear thereof. The chain now extends in a forward direction around an idler sprocket-wheel 35, up alongside a sprocket-wheel 36 positioned along the outer side of the sprocket-wheel 27—28 and finally to the point of its origin about the rear sprocket-wheel 33. This completes the course of the chain 34.

The design of the double sprocket-wheel 24—25 is shown more clearly in Figure 4. It is seen that the truss plate 14 carries a fixed drum or hub on which the sprocket-wheel is mounted through the agency of a ball bearing 36ª.

The structure of the double sprocket-wheel 27—28 is illustrated in Figure 5. Here it is evident that the sprocket-wheel is revoluble through a ball bearing 37 on the neck 38 which constitutes a reduction of the sprocket-wheel 36. On the inner side of the sprocket-wheel 27—28 the neck 38 is enlarged to form a spur gear 39. The integral assembly of the sprocket-wheel 36, neck 38 and gear 39 is journaled on a fixed shaft 40 carried by and extending outwardly from the side beam of the body frame 16. The sprocket-wheel 27—28 is recessed opposite the spur gear 39 to form an internal gear 41, and a connection between the latter and the spur gear 39 is formed by the interposition of a pinion 42, this pinion also being carried by the frame beam, as indicated in Figure 2.

The idler sprocket-wheel 35 is hung on a spring arm 43 which is secured to and projects from the side beam of the base frame 10. The function of this idler is of course to take up slack in the chain 34.

With the component elements of the above gearing properly balanced as to ratio, it will be evident that the initial or high speed of the motor shaft 19 will be transmitted to the wheel through a reduction gearing which not only runs easily on its ball bearings but is also flexible and shock-absorbing both as to uneven power impulses and road shocks received by the vehicle. The use of the chains lends a powerful influence upon the parts affected and avoids the grinding noise usually present when gears alone are used. It will be noted that the chain 34 is so trained as to absorb variations in the spacing of the two vehicle frames from road vibration, this feature being evidenced in the oblique direction of the chain runs from the sprocket wheels 33 and in the provision of the idler 35.

The novel gearing thus requires but little power to actuate it, and should be of valuable service for driving railway yard trucks, farm vehicles and the like. It should be understood that the present illustrations are but indicative of the principle involved in the novel gearing, and that many structural changes or additions may be applied in keeping with standard machine practice when the gearing is actually constructed or installed, without the exercise of invention, in order that a practical result may be attained.

I claim:—

1. A drive gearing for a vehicle wheel comprising a drive sprocket, a gear carried by the vehicle wheel, a pinion assembly applied to said gear, a sprocket-wheel assembly carried by the pinion-assembly, an intermediate sprocket-wheel assembly, a chain drive between the drive sprocket and the intermediate sprocket-wheel assembly, a chain drive between the latter and first mentioned sprocket-wheel assembly, and a regulating sprocket-wheel associated with said last mentioned chain drive and geared to the intermediate sprocket-wheel assembly.

2. A drive gearing for a vehicle having a base frame carrying a power source and traction wheel, and a body frame resiliently supported by the base frame, comprising: a power-driven sprocket-wheel carried by the base frame, a gear carried by the wheel, a pinion-assembly carried by the base frame and applied to said gear, a sprocket-wheel assembly carried by the pinion-assembly, an intermediate sprocket-wheel assembly carried by the body frame, a chain drive carried by the base frame and connecting the power-driven sprocket-wheel and the intermediate sprocket-wheel assembly, and a chain drive between the latter and the first mentioned sprocket-wheel assembly.

3. A drive gearing for a vehicle wheel comprising a power-driven sprocket-wheel, a gear carried by the vehicle wheel, a pinion assembly applied to said gear, a sprocket-wheel assembly carried by the pinion-assembly, a drive chain between said power-driven sprocket-wheel and said sprocket-wheel assembly, an intermediate sprocket-wheel, operated by the drive of said sprocket-wheel assembly, a secondary sprocket-wheel axial of and reversely geared to the intermediate sprocket-wheel, and a chain trained over the several sprocket-wheel whereby to operate the intermediate sprocket-wheel and said sprocket-wheel assembly in one direction and the secondary sprocket-wheel and the power-driven sprocket-wheel in the opposite direction.

4. A drive gearing for a vehicle wheel comprising a twin sprocket-wheel having a chain drive to one section from a power source, a gear carried by the vehicle wheel, a pinion assembly applied to said gear, a sprocket-wheel assembly carried by said pinion-assembly, a twin intermediate sprocket-wheel with one section operated by the chain drive to said sprocket-wheel section, a secondary sprocket-wheel axial of and reversely geared to the intermediate sprocket-wheel, and a chain trained over the other section of the twin sprocket-wheel, the other section of the intermediate sprocket-wheel and said sprocket-wheel assembly whereby to operate the intermediate sprocket-wheel and said sprocket-wheel assembly in one direction and the secondary sprocket-wheel and the power-driven sprocket-wheel in the opposite direction.

5. A drive gearing for a vehicle wheel comprising a twin sprocket-wheel having a chain drive to one section from a power source, a gear carried by the vehicle wheel, a pinion assembly applied to said gear, a sprocket-wheel assembly carried by said pinion-assembly, a twin intermediate sprocket-wheel with one section operated by the chain drive to said sprocket-wheel section, a secondary sprocket-wheel axial of and reversely geared within an internal gear of the intermediate sprocket-wheel, and a chain trained over the other section of the twin sprocket-wheel, the other section of the intermediate sprocket-wheel and said sprocket-wheel assembly whereby to operate the intermediate sprocket-wheel and said sprocket-wheel assembly in one direction and the secondary sprocket-wheel and the power-driven sprocket-wheel in the opposite direction.

6. A drive gearing for a vehicle wheel comprising a chain drive to one section of a twin sprocket-wheel, a second twin sprocket-wheel having one section in gear with said chain drive, a sprocket-wheel assembly geared to the vehicle wheel, a sprocket-wheel reversely geared to the second twin sprocket-wheel, and a chain looped over the other sections of the twin sprocket-wheel and second twin sprocket-wheel, over the sprocket-wheel, and over the sprocket-wheel assembly whereby to operate the twin sprocket-wheel in the direction of the sprocket-wheel and the sprocket-wheel assembly in the direction of the second twin sprocket-wheel.

In testimony whereof I affix my signature.

ANTONIO FONDEVILA.